(12) United States Patent
Govorkov et al.

(10) Patent No.: US 8,354,611 B2
(45) Date of Patent: Jan. 15, 2013

(54) LASER ENGRAVING APPARATUS

(75) Inventors: Sergei V. Govorkov, Los Altos, CA (US); Luis A. Spinelli, Sunnyvale, CA (US)

(73) Assignee: Coherent, Inc., Santa Clara, CA (US)

( * ) Notice: Subject to any disclaimer, the term of this patent is extended or adjusted under 35 U.S.C. 154(b) by 683 days.

(21) Appl. No.: 12/551,837

(22) Filed: Sep. 1, 2009

(65) Prior Publication Data

US 2010/0102043 A1 Apr. 29, 2010

Related U.S. Application Data

(60) Provisional application No. 61/109,411, filed on Oct. 29, 2008.

(51) Int. Cl.
*B23K 26/00* (2006.01)

(52) U.S. Cl. ......... 219/121.69; 219/121.82; 219/121.85; 358/3.29; 358/3.31; 347/224; 347/262

(58) Field of Classification Search .............. 219/121.68, 219/121.69, 121.82, 121.85; 358/3.29, 3.31, 358/3.32; 347/224, 225, 262, 264
See application file for complete search history.

(56) References Cited

U.S. PATENT DOCUMENTS

| | | | |
|---|---|---|---|
| 5,236,535 A | 8/1993 | Smith | |
| 5,317,337 A | 5/1994 | Ewaldt | |
| 5,500,924 A | 3/1996 | de Silva et al. | |
| 5,751,436 A * | 5/1998 | Kwon et al. | 219/121.68 |
| 5,833,274 A | 11/1998 | Schmidt | |
| 5,837,337 A | 11/1998 | Schnitzer | |
| 5,855,969 A * | 1/1999 | Robertson | 427/555 |
| 6,313,436 B1 | 11/2001 | Harrison | |
| 6,852,948 B1 | 2/2005 | Harrison | |
| 7,154,523 B2 | 12/2006 | Bronson | |

* cited by examiner

*Primary Examiner* — Hsien Ming Lee

(74) *Attorney, Agent, or Firm* — Morrison & Foerster LLP

(57) ABSTRACT

In laser engraving apparatus for engraving a gray-scale image on a plastic ID-card, the laser is a modulatable optically pumped semiconductor laser. Focusing optics focus a beam from the laser into a focal spot about 10 micrometers in diameter. The ID-card is mounted on a turntable which is rotated such that the focal spot sweeps over the ID card. The turntable is translated in a direction transverse to the rotation direction and the laser is modulated such that the engraved gray-scale image is formed by a matrix of parallel black lines of various length and spacing.

15 Claims, 2 Drawing Sheets

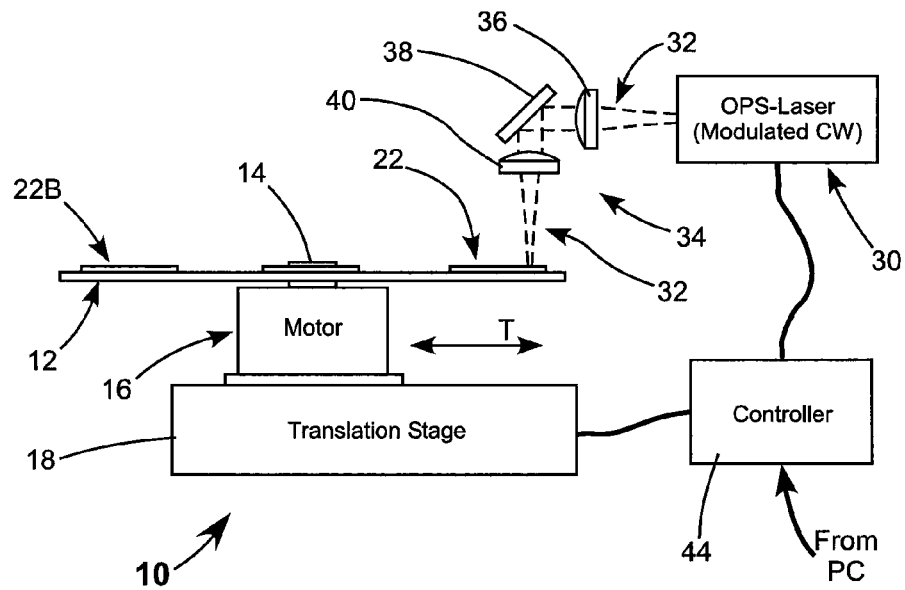
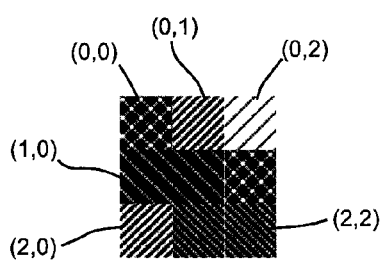
FIG. 3
FIG. 4
FIG. 5

LASER ENGRAVING APPARATUS

PRIORITY

This application claims priority to prior U.S. Provisional Application No. 61/109,411, filed Oct. 29, 2008, the disclosure of which is incorporated by reference.

TECHNICAL FIELD OF THE INVENTION

The present invention relates in general to laser engravers. The invention relates in particular to laser engravers for engraving images and text information on plastic identity cards (ID cards).

DISCUSSION OF BACKGROUND ART

Desk-top sized printing systems are now in common use for preparing small quantities (a few per day) of ID cards on an as-need basis. Such ID cards typically include a photographic image of a person being issued with the card in addition to the name of the person and possibly other information concerning the person.

These ID-card systems include dye-sublimation systems and laser engraving systems. Dye sublimation printing has an advantage that a color photograph can be printed. The photograph information however is fragile, which requires that a laminated transparent cover must be provided for their protection. In a laser engraving system an ID card is produced by burning a photograph and information into a light colored (usually white) plastic card using a focused laser beam. This provides a much more durable image than a dye-sublimation printed image. The laser-engraved image usually does not require a laminated cover for protection. Further, the laser engraving systems do not require consumables such a printing-ink or dye cartridges, toner, or the like.

A type of laser typically used in such engraving systems is a Q-switched, pulsed near infra-red (NIR) laser including a solid-state gain-medium such as neodymium-doped YAG (Nd:YAG). This type of laser typically delivers a beam of pulses having a duration between about 10 and 100 nanoseconds (ns) at a pulse-repetition frequency (PRF) between about 10 kilohertz (kHz) and 100 kHz. The peak power of the laser is usually required to be about one kilowatt (kW). The beam is focused on the card being printed, and is typically scanned by a two-axis scanning galvanometer, in vector fashion, over the card, in order to build up a pixellated image. The pixel-size in an image is determined by the size of the focal spot of the focused beam and is typically between about 30 and 100 micrometers ($\mu$m) in diameter.

A gray-scale image is produced by varying the laser flux in each pixel. In response to a laser flux, black grains grow within the pixel spot-size. The number of grains increases with increasing laser flux until the entire area of the spot is black. Gray scale is controlled by controlling the flux to control the area of the focal spot occupied by the black grains. This requires very fine control of the laser flux to provide consistent, reproducible results. While the degree of control required is not impossible to provide in a Q-switched pulsed laser, it adds considerably to the complexity and cost of the laser, and, accordingly, to the cost of engraving apparatus.

SUMMARY OF THE INVENTION

The present invention is directed to a method of engraving a reproduction of an original gray-scale image on a substrate. The original gray scale image comprises a plurality of pixels each thereof having a pixel dimension and a gray-scale value. In one aspect of the invention, the method comprises, mounting the substrate on a turntable having a rotation axis, rotating the turntable about the rotation axis, and focusing a modulatable beam of laser radiation from a CW external-cavity surface-emitting semiconductor laser into a focal spot on the substrate. The turntable and the substrate thereon are rotated, the focal spot of the laser beam is translated across the substrate, and the beam is modulated such that the replica of the gray-scale image is engraved on the card with each pixel of the original image being reproduced as a plurality of about parallel lines having a length in the rotation direction and a spacing therebetween in the translation direction selected to represent the gray-scale value of that pixel.

In one embodiment of the inventive method all of the lines in a reproduced pixel have the same length, and the gray-scale value of the pixel is represented only by the spacing of the lines. In another embodiment of the method the lines in a reproduced pixel have different lengths and the gray-scale value of the pixel is represented by the spacing and lengths of the lines. At least a portion of the lines in a reproduced pixel may be contiguous.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 2 an elevation view schematically illustrating details of the turntable translation arrangement in the apparatus of FIG. 1.

FIG. 3 schematically illustrates a square matrix of nine contiguous pixels (0,0 through 2,2) in a gray-scale image to be engraved by the apparatus of FIGS. 1 and 2.

FIG. 4 schematically illustrates nine laser engraved "equivalent" pixels corresponding to the pixels of FIG. 3 with gray scale simulated by the spacing of engraved black lines of equal length extending through each pixel, and with adjacent pixels 1,0 and 1,1 having the same one of 15 different equally spaced gray-scale values.

FIG. 5 schematically illustrates equivalent pixels 1,0 and 1,1 of FIG. 4 with two lines in pixel 1,0 shortened to lighten the gray value of pixel 1,0 relative to that of pixel 1,1 by less than one-fifteenth.

DETAILED DESCRIPTION OF THE INVENTION

Figure 1:
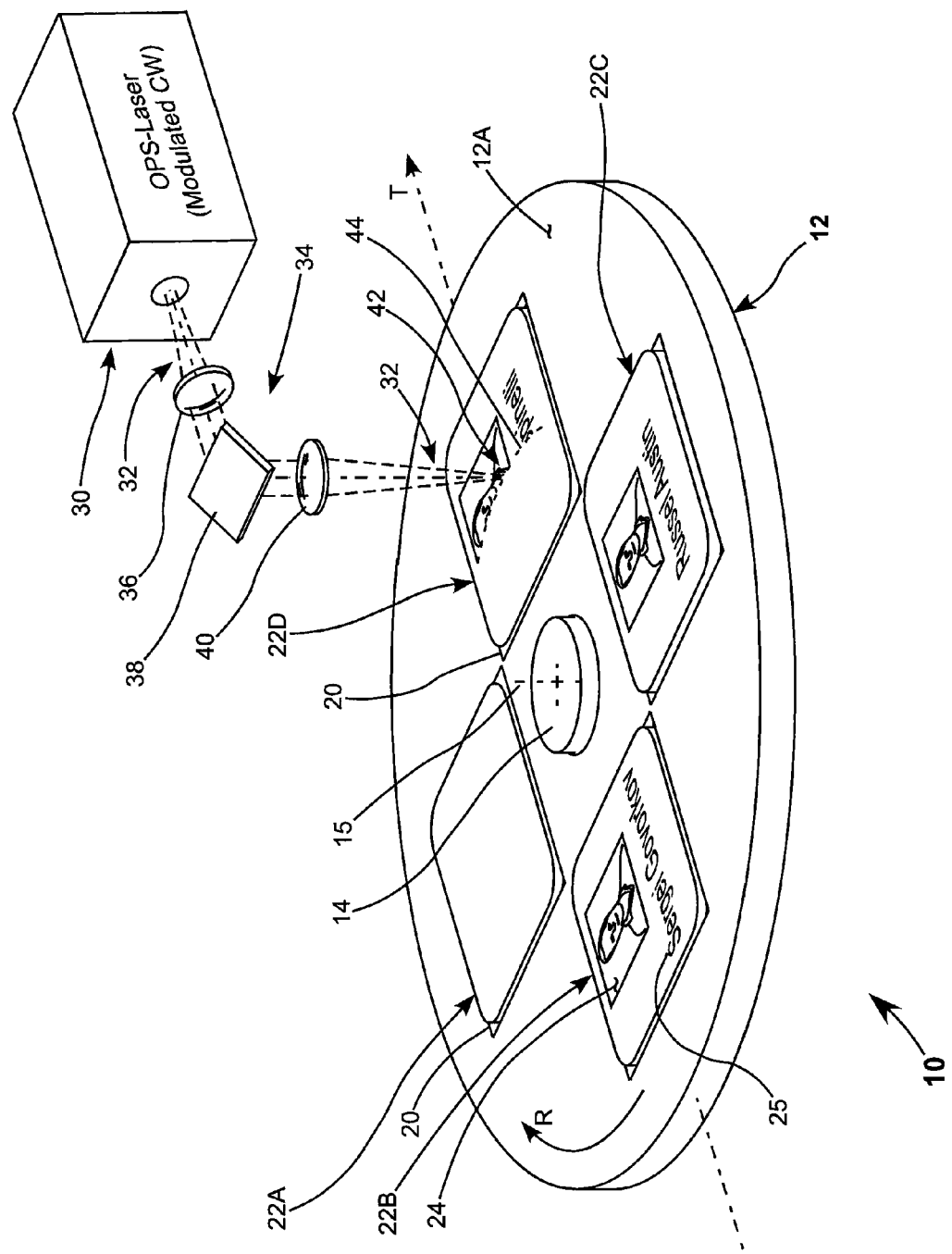
FIG. 1 is a three-dimensional view schematically illustrating one preferred embodiment of laser ID-card engraving apparatus in accordance with the present invention including rotatable turntable supporting ID-cards to be engraved, an OPS-laser delivering a CW beam of laser radiation, and focusing optics for focusing the beam on the cards to be engraved, the turntable being translatable with respect to the focused laser beam in a direction transverse to the rotation direction of the disc.

Referring now to the drawings, wherein like components are designated by like reference numerals, FIG. 1, and FIG. 2 schematically illustrate one preferred embodiment 10 of laser marking apparatus in accordance with the present invention. Apparatus 10 includes a turntable or disc 12 mounted on a hub 14 of a drive motor 16 (see FIG. 2). Drive motor rotates the turntable about an axis of rotation 15 as indicated in FIG. 1 by arrow R. The drive motor with the turntable thereon is translatable in a direction transverse to the rotation direction, by a translation stage 18 (see FIG. 2). The translation direction is indicted in FIGS. 1 and 2 by arrow T.

Turntable 12 has a plurality of recesses 20 therein (see FIG. 1). These recesses are sized to hold ID-cards (substrates) 22 to be printed (engraved), here, with a gray-scale image 24 and text 25. Cards 22B and 22C have been printed. Card 22A is blank. Card 22D is in the process of being printed.

Apparatus 10 includes an optically pumped, external cavity, surface-emitting semiconductor laser (OPS-Laser) 30. Laser 30 delivers a beam 32 of laser radiation. The beam is delivered to focusing optics 34. Focusing optics 34 include a collimating lens 36, a turning mirror 38, and a focusing lens 40. Focusing lens 40 focuses beam 32 onto the surface of the card being engraved into a focal spot 42. Printing a gray-scale image is a carried out by turning the laser on and off while the turntable is rotated and translated such that the image is printed as a plurality of black lines of different lengths in the rotation direction and different spacings in the translation direction. The turntable can be translated continuously such that adjacent lines are on spaced-apart, nearly-parallel portions of a continuous spiral track of the focal spot over the disc. Alternatively the turntable can be translated incrementally, such that adjacent lines are on adjacent circular tracks of the focal spot over the disk. It is also possible to translate mirror 38 and lens 40 relative with the turntable rotation-axis stationary to provide transverse translation of the focal spot over the turntable.

An OPS-laser is typically optically pumped by radiation from a diode-laser or an array of diode-lasers. An OPS-laser nominally delivers a continuous wave (CW) beam but the beam can be modulated at rates as a high as hundreds of megahertz (MHz) by modulating the diode-laser or lasers providing the optical pump radiation. An OPS-laser is also readily operable to produce a single-transverse-mode beam capable of being focused into a spot having a diameter of about 10.0 µm or less. A fundamental CW power of about 10.0 Watts (W) can be delivered in a single transverse mode from a relatively compact resonator, for example, a resonator having an optical length of about 10 centimeters (cm). Further information about OPS type lasers can be found in U.S. Pat. No. 6,285,702 incorporated herein by reference.

10.0 Watts 980 nm-radiation in a 10 µm-spot would provide for a linear engraving speed of about 10 meters per second (m/s) on white polycarbonate material. This linear speed would be provided by a turntable rotation speed of about 1200 revolutions per minute (rpm) at a radius of about 15 cm and is sufficient to engrave a 50×80 mm gray-scale image in about 5 minutes. If four cards were engraved simultaneously the engraving time for each card would be about 1.25 minutes. This is comparable to the performance of currently-available low-volume laser engravers employing a pulsed, Q-switched NIR laser.

Referring now to FIGS. 3 and 4, a pixellated image to be engraved is loaded into a computer such as a personal computer (PC). If the image is in color, the PC converts the image to a pixellated gray-scale image. The PC converts each pixel of the gray-scale image into a plurality of parallel black lines, with the number of lines depending on the gray-scale value of the pixel. FIG. 3 schematically depicts nine arbitrary gray-scale pixels with the gray-scale values graphically represented by various cross-hatchings for convenience of illustration in a black-and-white (single-bit) drawing format. In reality each pixel in FIG. 3 would be of some continuous shade of gray. The pixels are designated by row and column coordinates with rows numbered from top to bottom and columns from left to right as is usual in computer graphics practice.

FIG. 4 schematically illustrates each of the pixels of FIG. 3 reduced to "equivalent" pixels each including some number of parallel black lines each having a length equal to an original pixel length and a width representative of the line-width that is produced by the focal spot of beam 32. The number of such lines in any original pixel dimension is representative of the gray scale. In FIG. 4, the maximum possible number of lines is arbitrarily set at 15. While adjacent parallel lines are depicted in FIG. 4, for convenience of illustration, as having white space therebetween, preferably such adjacent lines are contiguous, to maximize image contrast. Clearly when the number of black lines in an equivalent pixel is less than the maximum number possible there will be white space (lines) having one or more black-line widths between black lines.

The distribution of lines within an equivalent pixel is determined by considering the lines themselves as a one-dimensional array of pixels and distributing the lines using a technique known to practitioners of the computer graphics art as "dithering". Briefly this technique includes testing pixels in an area required to have some desired gray (in the present case) or color value and distributing the pixels such that the running cumulative difference of adjacent pixels from that value is minimized. In the example of FIG. 4 where the actual pixels are either black or white lines, a 50% gray value for an equivalent pixel would be represented, using such a dithering algorithm, as alternating black and white lines, i.e., as black lines on a white background with the black lines spaced apart by one line-width. A black line has a value 50% greater than the desired value and is followed by white line which has a value 50% less than the desired value to reduce the running cumulative difference to zero.

The example of FIG. 4 is limited in a range of possible gray-scale values by the number of lines that can be drawn in an "equivalent" pixel. This number depends on the minimum line width of a pixel and the pixel dimension of the original image, which is will usually be about 100 µm (0.1 millimeters) or less. By way of example, the number may be between about ten and twenty. The above-noted rapid rate at which an OPS-laser can be modulated permits that this number can be increased by varying the length in addition to the number of black-lines in a pixel dimension. In the equal line-length example of FIG. 4, a modulation rate of only about 100 kHz is necessary to simulate 100 µm pixels at a writing speed of 10 m/s. A 1.5 megahertz (MHz) modulation rate would permit that any line could have 15 different lengths, thereby increasing the number of gray-values to 225, i.e., comparable to what is achievable with an 8-bit gray-scale representation.

FIG. 5 schematically illustrates one example, wherein lines of different length are used. In this example, pixels (1,0) and (1,1) of FIG. 4, which have the same simulated gray scale value in FIG. 4 have been given different values by reducing the length of the second and thirteenth (here, arbitrarily chosen) lines of pixel (1,0). To change the lighten the gray scale value of pixel (1,0) by about ⁴⁄₁₅ compared with that of pixel (1,1). Preferably, when using the length an addition to the number of lines for gray-scale simulation, the dithering algorithm is applied in two dimensions. Referring again to FIG. 2, however the lines are generated, beginning and end data for all of the lines is communicated from the generating-computer to a controller that modulates laser 30 cooperative with the rotation speed and parallel-path increment of the focal spot (resulting from relative motion of the focal spot over the turntable) such that an image is engraved corresponding to the communicated data.

It should be noted, here, that the dithering technique is described herein only to an extent sufficient for understanding principles of the present invention. Several dithering examples are described in detail in prior-art relating to electronic image manipulation for printing, and such algorithms are typically incorporated in commercially available image manipulation software such as Adobe® Photoshop®.

Those skilled in the art will recognize that while the lines in FIGS. 4 and 5 are represented as being straight lines, the lines will in fact be arcuate. For a nominal equivalent pixel dimension of 100 μm, however, the curvature of the lines can not be easily represented on the scale of the drawings. Geometrical distortion of the image because of the arcuate lines can easily corrected by software when the gray-scale pixellated image is converted to lines. The writing speed at the outer edge of an image will be greater than that at the inside edge. The difference in writing speed, however, is relatively unimportant as the laser intensity is deep in saturation in terms of blackening of the card material so the effect of speed change on contrast of individual lines is negligible.

The present invention is described above with reference to laser engraving apparatus in which a focused beam from a modulated OPS-laser is used for engraving a gray-scale image. The use of an OPS-laser provides that the beam size at focus can be as little as 10 μm diameter such that a CW power as low as 10 W can provide a linear engraving speed of about 10 m/s. This high engraving speed is accommodated by mounting an ID-card to be on a turntable rotatable at rate between about 500 and 5000 RPM. The turntable is translated in a direction transverse to the rotation-direction such that the gray-scale image is written as a collection of parallel lines of different spacing and different lengths. The relatively high rate at which the OPS-laser can be modulated, combined with the high engraving speed, provides that a 500×200 pixel gray-scale image with a resolution comparable with 8-bit gray-scale representation can be engraved in about one minute. The inventive apparatus differs from prior-art laser-engraving apparatus inasmuch as gray-value variation does not require variation of the output power of the engraving laser. This provides for more consistent and reproducible results.

In summary, the present invention is described above in terms of a preferred and other embodiments. The invention is not limited, however, to the embodiments described and depicted. Rather, the invention is limited only by the claims appended hereto.

What is claimed is:

1. A method for engraving a reproduction of an original gray-scale image on a substrate, the gray scale image comprising a plurality of pixels each thereof having a pixel dimension and a gray-scale value, the method comprising the steps of:
   mounting the substrate on a turntable having a rotation axis;
   rotating the turntable about the rotation axis;
   focusing a modulatable laser beam into a focal spot on the substrate; and
   rotating the turntable and the substrate thereon, translating the focal spot of the laser beam across the substrate in a direction transverse to the rotation direction, and modulating the laser beam such that the replica of the gray-scale image is engraved on the substrate with each pixel of the original image being reproduced as a plurality of about parallel lines having a length in the rotation direction and a spacing therebetween in the translation direction selected to represent the gray-scale value of that pixel.

2. The method of claim 1, wherein all of the plurality of about parallel lines in a reproduced pixel have the same length and the gray-scale value of the pixel is represented only by the spacing of the lines.

3. The method of claim 1, wherein the plurality of about parallel lines in a reproduced pixel have different lengths and the gray-scale value of the pixel is represented by the spacing and lengths of the lines.

4. The method of claim 1, wherein at least a portion of the plurality of about parallel lines in a reproduced pixel are contiguous.

5. The method of claim 1, wherein the laser beam is generated by a CW diode-laser pumped external-cavity surface-emitting semiconductor laser.

6. The method of claim 5, wherein the laser beam is modulated by correspondingly modulating the CW pumping diode-laser.

7. The method of claim 6, wherein the turntable is rotated at a rate between about 500 RPM and 5000 RPM, the CW power of the laser beam is about 10 Watts and the linear engraving speed is about 10 meters per second.

8. Apparatus for engraving a reproduction of an original gray-scale image on a substrate, the gray scale image comprising a plurality of pixels each thereof having a pixel dimension and a gray-scale value, the apparatus comprising:
   a turntable on which the substrate can be mounted, the turntable being rotatable about a rotation axis thereof;
   a laser arranged to deliver a modulatable laser beam
   an arrangement for focusing the modulatable laser beam into a focal spot on the substrate and translating the focal spot of the laser beam across the substrate in a direction transverse to the rotation-direction; and wherein
   the turntable rotation, the focal spot translation and the laser beam modulation are selected such that the reproduction of the gray-scale image is engraved on the substrate with each pixel of the original image being reproduced as a plurality of about parallel lines having a length in the rotation direction and a spacing therebetween in the translation direction selected to represent the gray-scale value of that pixel.

9. The apparatus of claim 8, wherein all of the plurality of about parallel lines in a reproduced pixel have the same length and the gray-scale value of the pixel is represented only by the spacing of the lines.

10. The apparatus of claim 8, wherein the plurality of about parallel lines in a reproduced pixel have different lengths and the gray-scale value of the pixel is represented by the spacing and lengths of the lines.

11. The apparatus of claim 8, wherein at least a portion of the plurality of about parallel lines in a reproduced pixel are contiguous.

12. The apparatus of claim 8, wherein the laser beam is generated by a CW diode-laser pumped external-cavity surface-emitting semiconductor laser.

13. The apparatus of claim 12, wherein the laser beam is modulated by correspondingly modulating the CW pumping diode-laser.

14. The apparatus of claim 12, wherein the laser beam has a CW power of about at least 10 Watts.

15. The apparatus of claim 14, wherein the turntable is rotatable at a rate between about 500 RPM and 5000 RPM.

* * * * *